3,052,628
LOW FLUID LOSS COMPOSITION
C. J. Stanberry, Jr., and William L. Groves, Jr., Ponca City, Okla., assignors to Continental Oil Company, Ponca City, Okla., a corporation of Delaware
No Drawing. Filed Sept. 11, 1959, Ser. No. 839,280
9 Claims. (Cl. 252—8.55)

This invention relates to the treatment of fluids used in well working operations, such as drilling and hydraulic fracturing.

In the art of fracturing oil and gas wells, a special fluid composition (usually called fracturing fluid) is pumped down the well into contact with the formation to be fractured, and the pressure of the fluid composition is increased until the formation is fractured by hydraulic pressure. It is then usually desirable to incorporate a propping material, such as sand, in the fracturing fluid, whereby the propping material is carried into the fracture with the fracturing fluid. After the fracture has been extended to the extent desired, the pressure in the well bore is decreased and the fracturing fluid flows back into the well bore. At least a portion of the propping material is deposited in the fracture for maintaining the fracture open and enhancing the flow of formation fluids through the fracture into the well bore.

The type of fracture obtained is dependent primarily upon the penetrating characteristics of the fracturing fluid. That is, a low penetration fluid usually gives a vertical fracture (ordinarily the most desirable), and a high penetrating fracturing fluid usually gives a horizontal fracture (frequently along weak bedding planes in the formation, which is undesirable). Therefore, a primary concern in the art has been to reduce the penetrating characteristics (usually called the fluid loss) of fracturing fluids. Another consideration in the manufacture of fracturing fluids is viscosity. Some operators desire a high viscosity fracturing fluid, and others desire a low viscosity fracturing fluid. Therefore, it is highly desirable from an economical point of view that the same basic fracturing fluid can be readily adapted to either a high or low viscosity fluid.

Many attempts have been made to solve these problems of the art, and particularly the reduction of the fluid loss of fracturing fluids. The usual solution is to incorporate a large quantity of oil-insoluble materials, such as blown asphalt and rubber, in an oil carrier for literally plastering the face of a formation by an accumulation of the plastering material. These large amounts of plastering materials require correspondingly large amounts of dispersing agents and gelling agents to maintain the plastering materials in suspension under the various operating conditions. Fracturing fluids made in this manner undoubtedly attain good fluid loss properties, but the cost thereof is unnecessarily high and fluid invariably has a high viscosity. Also, the plastering materials heretofore used have relatively large particle sizes, thereby necessitating a large amount of the material to effectively seal a formation face.

Similar concepts have been used in making drilling fluids.

A recent development in the art of making fracturing fluids and fracturing fluid additives is shown in U.S. Patent 2,779,735, Jack L. Brown et al., issued January 29, 1957. This patent teaches the use of finely divided oil-insoluble materials having a substantial portion of its particles below 2 microns in size and an agglutinant dispersant in an oil carrier to form a fracturing fluid. The agglutinant has sufficient strength to cooperate with the small particles of the oil-insoluble, finely divided material to form a substantially fluid-impervious seal on the face of the formation.

The present invention relates to an improved fluid loss additive and composition of the general type described in the above-identified patent.

An important object of this invention is to provide an economical well working, low fluid loss composition.

Another object of this invention is to provide a basic low fluid loss composition having a low viscosity, wherein the viscosity may be easily increased as desired.

A further object of this invention is to provide a low fluid loss composition containing only a minor amount of solid material.

A more general object of this invention is to facilitate and economize well working operations.

Another specific object of this invention is to provide a low fluid loss composition comprising an oil carrier and only a minor amount of additive for reducing the fluid loss properties of the composition.

These and other objects of the invention will become more readily apparent from the following detailed description and discussion.

The foregoing objects are realized broadly by providing as a fluid loss additive for petroleum oil a composition comprising an oil-soluble calcium organic sulfonate, an agglutinant, and calcium hydroxide comprising particles in the size range of .005 to 2 microns. In one aspect of the invention, the foregoing additive composition is present in a petroleum oil. In another aspect of the invention, a petroleum oil containing said additive composition is employed in working a well.

The petroleum oil which is used as the carrier or vehicle in the improved fracturing and drilling fluid can be substantially any petroleum hydrocarbon liquid. For example, it is within the scope of the invention to use crude oil which is normally available in the vicinity of the well working operation. Such crude oils range in viscosity from 5 to 100 centipoises, but usually between 15 to 25 centipoises taken at a temperature of 70° F. In addition, refined petroleum products can be used, such as kerosene, pale oil, diesel fuel, fuel oil, etc.

The present invention contemplates the use of calcium hydroxide as an essential element of the additive composition. In addition to the calcium hydroxide, other oil-insoluble solids which can be obtained in finely divided form are also employed. Illustrative of the additional solids which find use in the invention are calcium carbonate, calcium chloride, calcium sulfate, carbon black, carboxy methyl cellulose, fuller's earth and similar products, magnesium or barium sulfate, mica, Portland cement, sodium borate, sodium carbonate, sodium chloride, sodium silicate, sodium sulfate, spent catalyst and walnut shells.

The oil-soluble organic sulfonates which are suitable for use in the invention are the calcium soaps of alkyl sulfonic acids, alkaryl sulfonic acids, the so-called mahogany or petroleum sulfonic acids, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include nonaromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil-solubility. The alkaryl sulfonates, however, require an alkyl portion totaling only about 18 carbon atoms. To attain the requisite oil-solubility, therefore, requires that the hydrocarbon portion of the sulfonate have a molecular weight between about 250 and 1,000. Preferably, this molecular weight is between 300 and 700. Particularly useful sulfonates include the calcium diwaxbenzene sulfonates, diwaxtoluene sulfonates, and postdodecylbenzene sulfonates. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24.

Other sulfonates which may be used in the process of this invention include, for example, mono- and poly-wax substituted naphthalene sulfonates, diphenyl ether sulfonates, naphthalene disulfide sulfonates, diphenyl amine sulfonates, dilauryl betanaphthol sulfonates, dicapryl nitro-naphthalene sulfonates, unsaturated paraffin wax sulfonates, hydroxy substituted paraffin wax sulfonates, tetra-amylene sulfonates, mono- and chlorosubstituted paraffin wax sulfonates, nitrosoparaffin wax sulfonates; cycloaliphatic sulfonates such as lauryl- cyclo-hexyl sulfonates, mono- and poly-wax substituted cyclo-hexyl sulfonates, and the like. The expression "petroleum sulfonate" is intended to cover all sulfonates derived from petroleum products.

A preferred oil-soluble sulfonate is the product produced by neutralizing postdodecylbenzene overhead sulfonic acid with calcium hydroxide. Postdodecylbenzene overhead sulfonic acid is the acid produced by sulfonating postdodecylbenzene overhead, which is a residue fraction obtained in the distillation of the produce resulting from the alkylation of benzene with dodecene. The average physical properties of postdodecylbenzene overhead before sulfonating are as follows.

| | |
|---|---|
| Specific gravity at 48° C | 0.866 |
| Average molecular weight | 300 |
| A.S.T.M. (D-158 Engler): | |
| I.B.P. ° F | 647 |
| 5 ° F | 625 |
| 10 ° F | 630 |
| 50 ° F | 656 |
| 90 ° F | 710 |
| 95 ° F | 730 |
| F.B.P. ° F | 738 |
| Refractive index | 1.4902 |
| Viscosity at 100° F., SUS | 110 |
| Bromine number | .40 |

In general, cationic, anionic and nonionic agglutinants can be used in the additive composition. As used herein, and in the appended claims, the term "agglutinant" may be defined as an oil-insoluble surface active agent which, when dispersed in oil, forms a gelatinous precipitate in the presence of a small amount of water. This includes straight chain compounds containing from 5 to 24, preferably 5–18 carbon atoms, and branched chain compounds containing from 5 to 18 carbon atoms. Particularly effective agglutinants include sodium caproate, sodium oleate, sodium stearate, sodium dodecylbenzene sulfonate, and sodium pelargonate. Sodium dodecylbenzenesulfonate is the final product produced by sulfonating dodecylbenzene followed by neutralization with sodium hydroxide. Physical properties of dodecylbenzene are approximately as follows.

| | |
|---|---|
| Specific gravity at 16° C | 0.8742 |
| Average molecular weight | 232 |
| A.S.T.M. (D-148 Engler): | |
| I.B.P. ° F | 535 |
| 5 ° F | 545 |
| 10 ° F | 550 |
| 50 ° F | 560 |
| 90 ° F | 580 |
| 97 ° F | 592 |
| F.B.P. ° F | 603 |
| Refractive index at 20° C | 1.4885 |
| Viscosity at 20° C., centipoises | 14 |
| Bromine number | 0.16 |

The agglutinants also include polyethylene oxide derivatives of alcohols, fatty acids, amines, amides, and phenols having an amount of ethylene oxide to solubilize the derivative in water. Generally speaking, the alcohol fatty acid, amine, amide, or phenol is reacted with about 1 to 2.5 times its weight of ethylene oxide to obtain a hydrophylic oil-insoluble surface active agent which forms a gelatinous precipitate in the presence of a small amount of water.

A very important consideration in the preparation of a fracturing or drilling fluid in accordance with this invention is the particle size of the oil-insoluble solids. It has been found that the objectives of this invention are attained by dispersing a minute quantity of a finely divided, calcium hydroxide in a petroleum oil. As to size (largest dimension of the particle), the particles can range from 0.005 to 2 microns. Generally, it is preferred to use particles the sizes of which may vary over a somewhat more limited range, namely 0.01 to 2 microns. It is not necessary, however, that the dispersed solid consist entirely of particles having sizes within these limits, as a suitable low fluid loss composition can be prepared wherein all or only a part of the dispersed solids consist of particles the sizes of which vary within the foregoing limits. A product of the latter category is preferred, as such a product is more economical and is available in greater quantities than the former. Regardless of which product is used, it has been found that a satisfactory low fluid loss composition is obtained by using a sufficient quantity of the solid to give a composition having a concentration of at least .0025 pound of particles the sizes of which fall within either of the foregoing size limitations per gallon of oil. Generally, it is preferred to use a quantity of solids such that the concentration of particles within either of the foregoing size limitations is about .05 pound per gallon of oil. Generally speaking, the total amount of solid used should not exceed .20 pound per gallon of oil, with at least .0025 pound of the solid (and preferably about 35 per cent of the solid) having a particle size from .005 to 2 microns. This amount of solid provides an economical composition having good fluid loss properties and the viscosity of the composition is not unduly high.

The following examples are presented in illustration of the invention. A fluid loss controlled formulation comprising calcium postdodecylbenzene overhead sulfonate, sodium dodecylbenzene sulfonate, and calcium hydroxide was prepared and tested for fluid loss by the Standard Field Procedure for Testing Drilling Fluids, Section IV, A.P.I. Test RP29, May 1950, using No. 987, Baroid filter paper. Another formulation comprising sodium postdodecylbenzene overhead sulfonate, sodium dodecylbenzene sulfonate, calcium chloride, and sodium sulfate was also prepared and tested in a similar manner. The results of the comparative tests are presented in Table I.

*Table I*

[Fluid loss, 1,000 p.s.i., 125° F., 0.05 pound/gallon, cc./30 minutes]

|  | 30% Ca postdodecylbenzene overhead sulfonate, 10% Na dodecylbenzene sulfonate, 60% Ca(OH)₂ | 40% Ca postdodecylbenzene overhead sulfonate, 10% Na dodecylbenzene sulfonate, 50% Ca(OH)₂ | 30% Na postdodecylbenzene overhead sulfonate, 10% Na dodecylbenzene sulfonate, 10% CaCl₂, 50% Na₂SO₄ |
|---|---|---|---|
| Standard crude [1] | 8.7 | 9.2 | [3] 99.0 |
| Hockley crude [2] |  | 16.0 | 65.0 |
| Kerosene |  | 16.5 | 18.0 |

[1] Mixture of approximately equal quantities of: (A) Crude oil obtained from McElroy formation, Crane County, Texas. (B) Austin chalk crude oil obtained from Milam County, Texas. (C) Commingle of East Placedo and Keeran Crudes obtained from Victoria County, Texas. (D) Almos-Navarro crude from Atascosa County, Texas.
[2] Crude oil obtained from Bee County, Texas.
[3] Cc./25 miuntes.

It is noted from Table I that the formulations containing calcium postdodecylbenzene overhead sulfonate and calcium hydroxide provide substantially improved fluid loss control over the other formulation.

In carrying out the invention only a sufficient amount of oil-soluble dispersing agent need be used to disperse the oil-insoluble solids in the petroleum oil. It has been found that from about .015 to .08 pound of dispersing agent per gallon of petroleum oil is sufficient. A larger amount of dispersing agent, up to one pound per gallon or even higher, can be used. However, these larger amounts are not desirable, since the cost of the fracturing or drilling fluid is increased, and no increased benefits are obtained.

In the event the petroleum oil being used contains a naturally occurring or previously incorporated oil-soluble dispersing agent, the amount of oil-soluble dispersing agent added to adapt the oil to a fracturing or drilling fluid can be proportionately reduced. In some oils, the oil-soluble dispersing agent can be dispensed with entirely.

It has been found that only from .01 to .08 pound of oil-insoluble surface active agent (agglutinant) per gallon of petroleum oil is required to produce a satisfactory low liquid loss fluid.

A preferred embodiment of this invention (when used in fracturing) comprises the use of calcium postdodecylbenzene overhead sulfonate as the oil-soluble dispersing agent, calcium hydroxide as the finely divided solid, and sodium dodecylbenzene as the agglutinant. While the composition preferably contains these components, it is within the scope of the invention to include also alkali metal and alkaline earth metal sulfonates and any of the finely divided solids previously described. The proportions of the materials present in the additive can vary over a relatively wide range. Usually the calcium postdodecylbenzene overhead sulfonate is present in an amount between about 30 to about 40 percent by weight, the sodium dodecylbenzene sulfonate between about 5 and 15 percent by weight, with the remainder of the additive composition being calcium hydroxide. The additive is ordinarily prepared by admixing the components to form a slurry and then evaporating water from the slurry on a drum drier. However, the desired particle size can also be obtained by dissolving the solid in a solvent and then dispersing the solution in the oil, as by emulsification, and then evaporating the solvent; or by forming a solution of the oxide or hydroxide, dispersing such solution in the oil and then acid treating the mass, as by blowing with carbon dioxide, and precipitating the fine insoluble solids in situ and removing the solids.

While it is not desired that the invention be limited to any particular theory, it is believed that the mechanics or operation of the composition of this invention is such that the oil-soluble dispersing agent functions solely to suspend the finely divided oil-insoluble solid in the petroleum oil. When the composition is placed under pressure against a subsurface formation (such as the walls of a well bore), a minor portion of the petroleum oil is initially forced into the pores of the formation. As this oil escapes into the formation, a portion of the oil-insoluble solid particles enters the formation pores and becomes wedged in the pores adjacent the formation surface, as well as deposited on the surface of the formation. The agglutinant forms a gelatinous-like layer or blanket on top of and between the deposited solids to provide a barrier at the formation surface which is substantially impervious to further flow of oil into the formation.

Generally speaking, a small amount of water (for example, 0.33 percent by weight based on the petroleum oil) facilitates the action of the fluid loss composition. It will be observed that this action follows the above-described theory, in that a small amount of water should assist in the precipitation of the agglutinant into a gelatinous-like layer or blanket. However, when an excessive amount of water is used, the agglutinant goes into solution in the water and the effectiveness of the composition is decreased.

Having thus described the invention by providing specific examples thereof, it is to be understood that no undue limitations or restrictions are to be drawn by reason thereof and that many variations and modifications are within the scope of the invention.

We claim:

1. A low fluid loss additive for petroleum oil consisting essentially of about 30 to about 40 weight percent of an oil soluble calcium alkaryl sulfonate, from about 5 to about 15 weight percent agglutinant, and from about 45 to about 65 weight percent calcium hydroxide as a finely divided solid, wherein at least 1.25 percent of said solid is particles in the size range from about .005 to about 2 microns.

2. A low liquid loss additive for petroleum oil consisting essentially of about 30 to about 40 weight percent calcium postdodecylbenzene overhead sulfonate, from about 5 to 15 weight percent sodium dodecylbenzene sulfonate, and from about 45 to about 65 weight percent calcium hydroxide as a finely divided solid, wherein at least 1.25 percent of said solid is particles in the size range from about .005 to about 2 microns.

3. The low liquid loss composition of claim 2 wherein the amount of the sodium dodecylbenzene sulfonate is about 10 weight percent.

4. A low liquid loss additive composition comprising a major portion of petroleum oil and a minor amount of low liquid loss additive for petroleum oil consisting essentially of about 30 to about 40 weight percent oil soluble calcium alkaryl sulfonate, from about 5 to about 15 weight percent agglutinant, and from about 45 to about 65 percent calcium hydroxide as a finely divided solid in an amount not to exceed about .2 pound per gallon of said oil, wherein at least .0025 pound of said solid per gallon of said oil is particles in the size range from about .005 to about 2 microns.

5. A low liquid loss additive composition comprising a major proportion of petroleum oil and a minor amount of low liquid loss additive for petroleum oil consisting essentially of about 30 to about 40 weight percent calcium postdodecylbenzene overhead sulfonate, from about 5 to about 15 weight percent sodium dodecylbenzene sulfonate, and from about 45 to about 65 weight percent calcium hydroxide as a finely divided solid in an amount not to exceed about .2 pound per gallon of said oil, wherein at least .0025 pound of said solid per gallon of said oil is particles in the size range from about .005 to about 2 microns.

6. The low liquid loss composition of claim 5 consisting essentially of about 10 weight percent sodium dodecylbenzene sulfonate.

7. In a process for working a well wherein a petroleum oil is forced into the well bore under pressure, the method of sealing subsurface formations traversed by the well bore against loss of appreciable amounts of said oil to the formations, which comprises incorporating in said oil an additive consisting essentially of about 30 to about 40 weight percent oil soluble calcium alkaryl sulfonate, from about 5 to about 15 weight percent agglutinant, and about 45 to about 65 weight percent calcium hydroxide as a finely divided solid in an amount not to exceed about .2 pound per gallon of said oil, wherein at least .0025 pound of said solid per gallon of said oil is particles in the size range from about .005 to about 2 microns, and contacting faces of the subsurface formations exposed to the well bore with said oil having said additive incorporated therein.

8. In a process for working a well wherein a petroleum oil is forced into the well bore under pressure, the method of sealing subsurface formations traversed by the well bore against loss of appreciable amounts of said oil to the formations, which comprises incorporating in said oil an additive consisting essentially of about 30 to about 40 weight percent calcium postdodecylbenzene overhead sulfonate, from about 5 to 15 weight percent sodium dodecylbenezene sulfonate, and from about 45 to about 65 weight percent calcium hydroxide as a finely divided solid in an amount not to exceed about .2 pound per gallon of said oil, wherein at least .0025 pound of said solid per gallon of said oil is particles in the size range from about 0.005 to about 2 microns, and contacting the faces of the subsurface formations exposed to the well bore with said oil having said additive incorporated therein.

9. The process of claim 8 in which the sodium dodecylbenzene sulfonate is present in an amount of about 10% by weight.

References Cited in the file of this patent

UNITED STATES PATENTS

| | | |
|---|---|---|
| 2,667,224 | Howard | Jan. 26, 1954 |
| 2,779,735 | Brown et al. | Jan. 29, 1957 |